United States Patent [19]

Clark et al.

[11] 4,052,025
[45] Oct. 4, 1977

[54] SEMI-BUOYANT AIRCRAFT

[76] Inventors: Frank M. Clark, 707 W. Carrillo, Santa Barbara, Calif. 91301; George M. Christner, 6277 Westmorland Place, Goleta, Calif. 93017

[21] Appl. No.: 564,853

[22] Filed: Apr. 3, 1975

[51] Int. Cl.$^2$ .......................... B64B 1/08; B64B 1/20
[52] U.S. Cl. ........................................ 244/25; 244/30; 244/125; 244/127
[58] Field of Search ............. 244/5, 25, 29, 30, 12 A, 244/97, 115, 125, 126, 128, 137 R, 50, 12.2

[56] References Cited

U.S. PATENT DOCUMENTS

| 928,524 | 7/1909 | Lake | 244/29 |
|---|---|---|---|
| 974,434 | 11/1910 | Rettig | 244/125 |
| 1,556,459 | 10/1925 | Szymanski | 244/97 |
| 1,567,703 | 12/1925 | Broyles | 244/115 |
| 2,091,580 | 8/1937 | Belinski | 244/25 |
| 2,365,827 | 12/1944 | Liebert | 244/30 X |
| 2,606,726 | 8/1952 | Henion | 244/50 |
| 2,876,969 | 3/1959 | Tydon et al. | 244/137 R X |
| 3,180,590 | 4/1965 | Fitzpatrick | 244/30 |
| 3,486,719 | 12/1969 | Fitzpatrick et al. | 244/25 |

FOREIGN PATENT DOCUMENTS 22,802  6/1913  United Kingdom ................ 244/125

OTHER PUBLICATIONS

"Hybrid Heavy-Lift Vehicle Under Study", Donald E. Fink, *Aviation Week & Space Technology, July 29, 1974,* pp. 49-51.

*Primary Examiner*—Trygve M. Blix
*Assistant Examiner*—Barry L. Kelmachter
*Attorney, Agent, or Firm*—James E. Hawes

[57] ABSTRACT

The disclosed semi-buoyant lift-augmented aircraft, preferably of immense size, includes a fuselage of airfoil shape formed by a rigid geodesic type web framework enclosing buoyant cells pressurized to reinforce the framework. Wings are provided which impart aerodynamic lift to the aircraft, with the airfoil fuselage. The buoyancy is provided to counteract a major proportion of the great weight of the structure and to thus improve the aircraft's payload capability and range. These features maintain it airborne at reasonable speeds over a substantial altitude range.

3 Claims, 5 Drawing Figures

SEMI-BUOYANT AIRCRAFT

BACKGROUND OF THE INVENTION

The increasing demand for the transportation of large volumes and great weight over long distances demands aircraft with great lift capabilities, capabilities far in excess of those afforded by present designs. Conventional heavier-than-air planes designed for large, heavy cargoes, require considerable power and speed in order to remain airborne. While present aircraft structures can transport weights and volumes which are amazing, they challenge the limits of present technology. Indeed, major advances in aircraft design and engine technology would be required to extend the payload capability of such structures substantially. In addition, the limitations posed simply by the length of available runways prohibit in a practical sense appreciable extension of conventional present heavier-than-air plane structures.

Lighter-than-air(LTA) crafts have been proposed to lift and transport large, heavy volumes. However, historically such LTA craft have been capable of carrying only relatively light payloads compared to their physical size. As the size of an LTA craft is increased, it is possible, due to the "cube law" (which shows that minor increases in dimension vastly increase volume, i.e., 1 foot cubed = 1 cu. ft. whereas 2 feet cubed — 8 cu. ft.), to reduce the relative weight of the framework envelope and other structure. Thus, although in small sizes the rigid airship cannot compete with the non-rigid or the airplane because its structural weight is prohibitive, as the size increases the weight of the rigid framework becomes less critical. The last commercially operated airship, the leviathan Hindenburg also known as LZ 129, which was destroyed in a disasterous fire at Lakehurst, New Jersey on May 6, 1937, was the largest dirigible (i.e., "steerable") airship ever launched. It was 804 feet long and 147 feet high. Built in Germany under the direction of the famous Dr. Hugo Eckner, "Hindenburg" contained over 7 million cubic feet of hydrogen gas with a useful lift (buoyancy) of 230 tons (460,000 lbs.). This great ship carried 40 crew members, 72 passengers and up to 25,000 pounds (12.5 tons) of cargo. To provide a larger lifting capability, such a structure in turn must be so large that the aerodynamic load imparted by atmospheric forces would determine its direction unless extremely powerful (therefore heavy) propulsion means were provided. Lighter-than-air crafts to date have used a constant differential pressure envelope to contain the buoyant gas. This envelope modulated its volume, typically helium, dependent upon altitude and temperature, breathing in (or out) ambient air to maintain overall vehicle volume constant. Such an arrangement in turn requires balloonettes to segregate the helium buoyancy volume from the air ballast volume to prevent mixing and loss of helium. For these reasons, conventional structures do not offer such promise for meeting the developing demand for transporting large volumes of heavy goods.

To solve such problems and meet this demand, this disclosure describes an aircraft that provides a means to achieve a constant envelope allowing the pressure to vary with altitude and temperature while at the same time provides other means to achieve inherent stability and enhance manueverability both in flight and on the ground.

SUMMARY OF THE INVENTION

A semi-buoyant lift-augmented aircraft is disclosed which includes a fuselage having an airfoil shape and a high lift wing to provide appreciable lift in an airstream. The fuselage includes a rigid external framework, preferably consisting of a geodesic type web helically wound around the longitudinal axis, and one or more buoyant cells within the rigid external framework pressurized to exert force on the framework and provide substantial structural reinforcement. A longitudinal channel for cargo is provided within the fuselage, the resulting hollow keel structure serving to further reinforce the aircraft. Preferably, the buoyant cell is of a fixed volume, thereby providing increased reinforcement to the framework as the aircraft rises to operating altitudes and stresses.

As a result of this novel configuration, in motion the combination of the buoyancy of the fuselage, its airfoil shape, and the lift imparted by the wings is sufficient to maintain the aircraft airborne, while the pressurized buoyant cells provide augmented reinforcement to maintain the structural integrity of the aircraft in the turbulent regime of flight.

BRIEF DESCRIPTION OF THE DRAWINGS

The invention will be further described in connection with the accompanying drawings, in which.

DETAILED DESCRIPTION OF THE INVENTION

Figure 1:
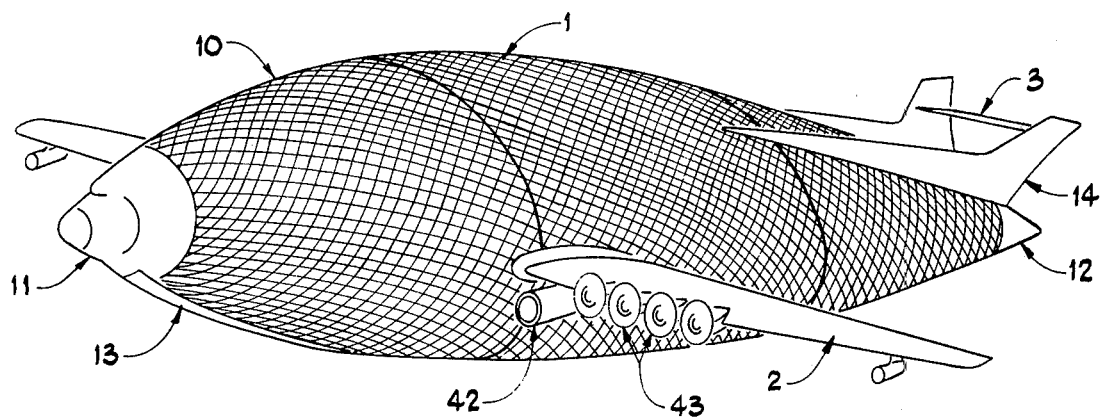
FIG. 1 is a perspective view of the preferred aircraft structure.
Figure 2:
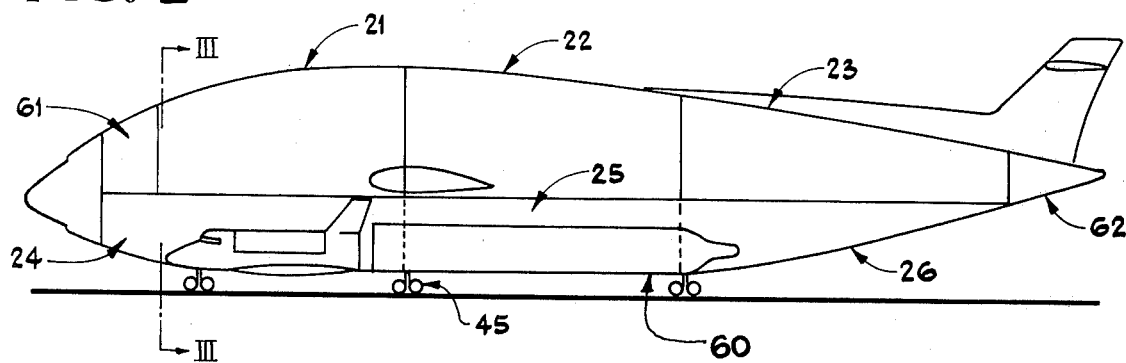
FIG. 2 is a side view in vertical section of the preferred aircraft structure.

The semi-buoyant lift augmented aircraft shown in FIG. 1 includes a fuselage 1 aerodynamically shaped to define a lifting body, as best shown in FIG. 2. The lifting body shape imparts considerable aerodynamic lift to the aircraft when in flight in an airstream with a minimum of aerodynamic drag, an important advantage as will be described. The aircraft includes a wing structure 2 and a tail structure 3. The tail structure includes twin vertical stabilizers supporting a transverse elevator. The stabilizers are extended forward substantially to direct and control airstream flow over the fuselage and maximize lift augmentation. The tail end of the fuselage also may be movable to serve as an additional elevator for pitch control.

While the aircraft may be constructed in any of a wide variety of sizes, it is well suited to a configuration suitable for transporting large, heavy cargoes. Particularly in view of this capability, the construction of the fuselage is important, offering many advantages. It consists of a rigid exoskeleton 10 consisting of a network or web of tension members helically wrapped about the fuselage and connected at their intersections to define a geodesic type of framework. This arrangement efficiently resists both lateral and longitudinal stresses. The exoskeleton 10 extends from a nose, which includes the flight deck and control systems for the plane, fairing 11 to a tail fairing 12. A central longitudinal channel 13 (best shown in FIG. 3) extends substantially the length of the fuselage and defines the cargo area. It provides appreciable structural reinforcement as well.

The semi-vertical tail surface fairings 14 extend above the exoskeleton hull aft of the maximum hull depth to act as fences to prevent orbital recirculation of the slip stream, much as the well known wingtip fences are utilized on smaller airplane wings, to reduce aerodynamic turbulence and thus decrease overall hull drag. These structures continue forward within the structure as longitudinal members to enhance the structural stiffness and to provide convenient and accessible tie members for the internal support of associated required structure.

Within, but attached to, the geodesic exoskeleton is a gas-tight container pressurized by a lighter-than-air gas, such as helium, whose volume is sufficient to offset a large portion of the aircraft's structural weight. Preferably, this container is configured as a single envelope. Transverse interior tension members are included to define, as shown in FIG. 2, upper compartments 21, 22, 23 and corresponding lower compartments 24, 25 and 26 on each side of the central longitudinal cargo channel. Alternatively, as the occasion demands, or as some designers may prefer, the container may be configured as a series of bags with gas-tight transverse membranes defining the compartments 21, 22, 23, 24 and 25 to provide enhanced capability in the selection of local pressure gradients within the structure as a means of relating such internal pressure to local outside pressure in the slipstream boundary layer about the hull.

Figure 4:
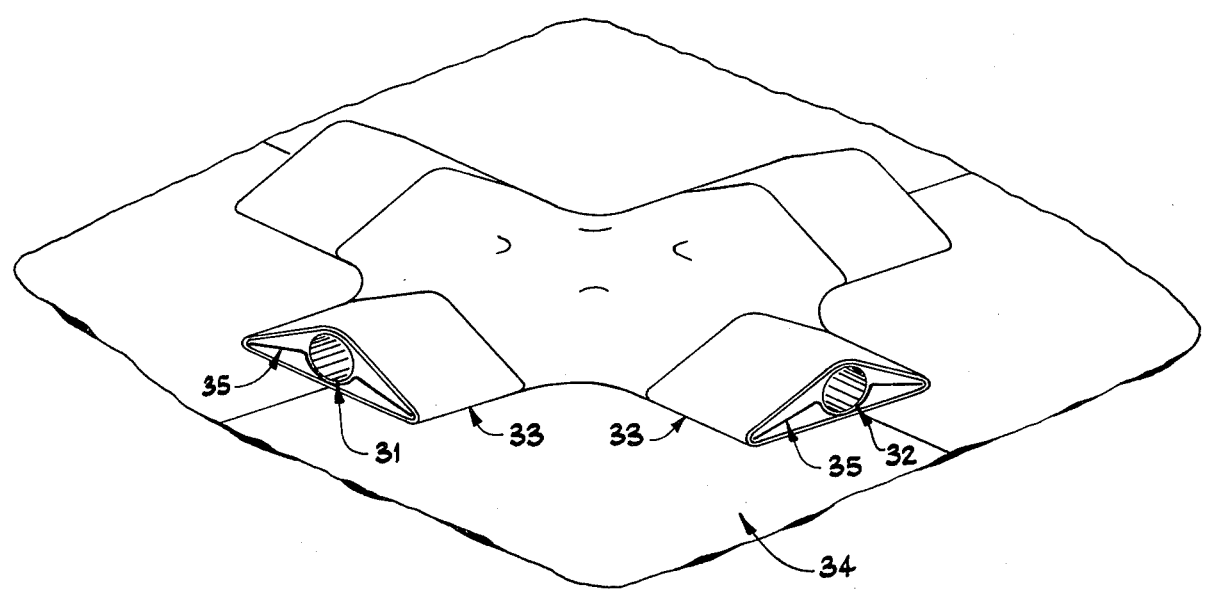
FIG. 4 is a perspective view of a portion of the fuselage framework of the preferred aircraft structure; and, FIG. 5 is a view in cross-section of the preferred framework joint construction.

Of course, various materials can be used to form both the exoskeleton and the gas-tight compartments. It is preferred, however, that the exoskeleton be configured as shown in FIG. 4, including high strength tubular skeleton members 31 and 32. Each member is surrounded by an aerodynamic fairing strip 33. This strip includes where required an anti-rub and low friction inner surface of a material such as teflon facing the gas-tight fabric 34 defining the buoyant compartments included by the fuselage structure. Appropriate stiffening elements 35 of a material such as reinforced Kelvar may be included in the exoskeleton to maintain the shape of the fairing, or the space between the tubular skeleton and the fairing may be filled with a low density, low weight, foam material such as polystyrene, or a combination of such stiffening elements may be used. The tubular exoskeleton members are joined together smoothly in accordance with the best practice for the material used, such as that shown in FIG. 5 for a typical intersection with penetration for a cross tie 36. A plugged access hole 37 permits installation and replacement of cross ties. Exoskeleton members 31 and 32 are bonded in place by suitable means for the material used, while the penetration is sealed by a clamp assembly 38 to prevent leakage of internal gas.

Figure 5:
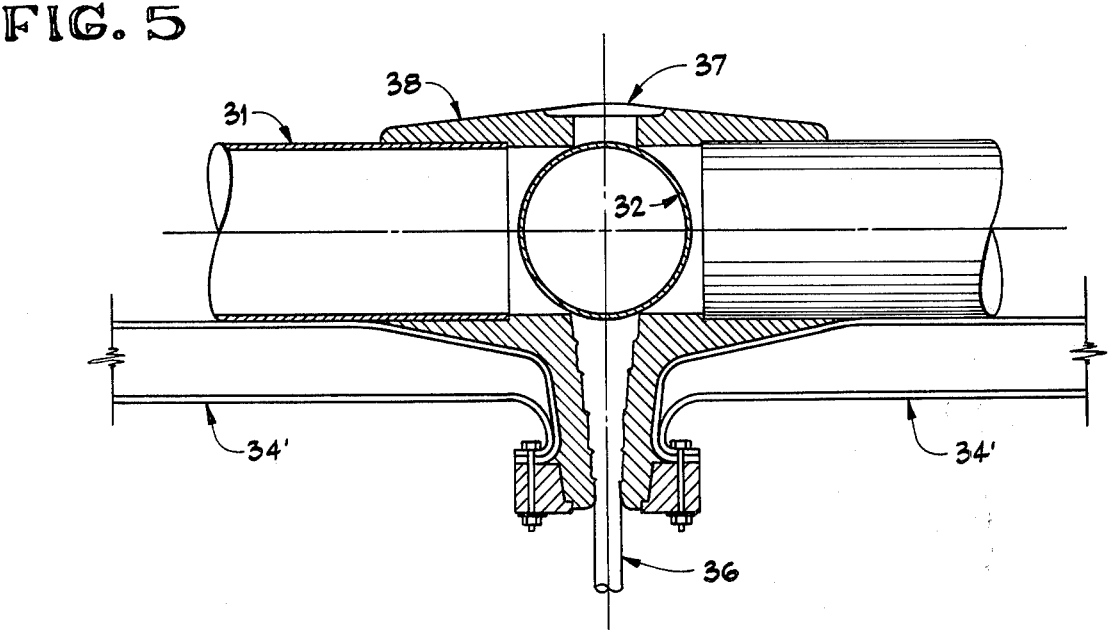

In a preferred variation of the fabric panels 34, the panels may be formed as a double walled member 34' as shown in FIG. 5. These panels include transverse walls as well to hold the surface panels together and to form internal channels and define the spacing between the surface panels. These modified panels 34' are internally pressurized to a pressure slightly different than the buoyant cell. Should the panel be perforated, the loss in its pressure may be sensed much more readily, since a much smaller volume is included, than could a change in pressure of the buoyant cell. Also, this double walled skin assists in insulating the buoyant cells so that changes in external temperature or in the sun load on the aircraft will not be imparted as readily to the buoyant cell, thereby assisting in stabilizing its buoyancy.

The gas-tight envelope enclosed by the exoskeleton preferably employs approximately 5,000 gores or panels. The coated fabric laminate of 2. to 8oz/yd$^2$ material is attached to the exoskeleton members to fill the open spaces between them and is in turn sealed to its adjacent gore or panel with a gas-tight joint with the layers overlapped to be stronger than the panels themselves. Such a joint and the requisite machinery, has been developed by ILC Industries. Thus the gas container is assembled in place from a multiplicity of gores or panels so that it is not necessary to introduce a single gas-tight envelope within the exoskeleton structure with attendant hazard to the impervious quality of envelope.

A major feature of design is achieved by this use of the gores or panels in that each fuselage segment can be preformed prior to installation to provide a vastly reduced radius of curvature between exoskeleton members, relative to the local radius of curvature generated by the exoskeleton network. Since the tensile stress in the envelope fabric is directly related to its radius of curvature as imposed by the contained pressure (stress is proportional to pressure times radius divided by material thickness), the panels are designed such that they protrude or bow out past the confining exoskeleton inner surface on a uniform radius to present a smooth contour such that adjacent panels appear to be quilted with respect to one another and the airframe exoskeleton. For an immense aircraft such as that whose dimensions are given here, the exoskeleton members would be approximately 7 inch diameter of tubular laminate with a 50 thousandth inch thick wall to support the anticipated maximum internal force produced by 10 psi gas pressure on a 100 square foot panel. The permitted radius of curvature of the panel can be reduced from approximately 100 feet to less than 20 feet to reduce the imposed stress by a factor of 5. During flight, since this flexible fabric skin would tend to conform to the airflow over the fuselage, drag will be reduced and operating efficiency increased.

The internal panel members when used may be 2 oz/yd$^2$ material. The gas envelope is coated with a pigmented reflectorized film to screen the suggested Kevlar material from ultraviolet exposure and to reflect infrared energy thus to assist in stabilizing internal temperatures. Without such a coating, appreciable changes in pressure and buoyancy could be produced simply by the interplay of sunlight and shadow on the aircraft. However, a variety of other structural and fabric materials are being developed which offer considerable promise and may be preferred by other designers.

A series of internal cables or cross ties 36 (FIG. 3) extend from the longitudinal channel structure 13 to holes in the exoskeleton members in the spaces between the buoyant cells. These cross ties define and maintain the fuselage shape. They also absorb appreciable torsional loading and assist in transferring the payload weight to the envelope structure.

It is preferred to assemble the fuselage structure in sections, each section being assembled in a large hangar, beginning the assembly of a section in a horizontal position and building the sides upward as the assembly proceeds. The helical exoskeleton members would be assembled first, then the gas-tight woven sheets or panels attached to one another and fixed to the exoskeleton preferably by being sealed or adherred directly to the exoskeleton in seams running beneath the pipe members 31. As the sectional structures are completed during this panelized assembly, they would be fitted with a lightweight internal bag pressurized with helium to a pressure of about 0.5 psi (sea level) and turned to their required vertical position, this pressure causing the bags to bear on and reinforce the structural integrity of the exoskeleton while easing handling. When the sectionalized assembly has grown sufficiently to meet the enclosure capability of the hanger, they would be placed in the required orientation and assembly continued until the sections had been married into a single fuselage. The wing structures, too, would be assembled independently of the fuselage then affixed to the wing stubs in their proper orientation. The wing stub includes an internal girder network carry through beam 41 (FIG. 3) extending transversely across the fuselage to attach the wings to one another and to the fuselage. The internal girder also is attached to the longitudinal channel to further integrate and reinforce the structure. Each wing includes a jet engine mounted near the stub end, and provide a series of turboprop engines 43 mounted on each wing. The jet engine assists the turbo-prop engines 43 mounted in the wings thus to provide a forward thrust sufficient to achieve an air speed on the order of 200 mph. Each wing structure also includes at its outer end a vectored thrust jet engine 44 computer controllable to optimize the orientation of the aircraft and counteract or control yaw and roll moments including those imparted by turbulence and other external aerodynamic forces. The wings also include conventional ailerons and spoilers, along with leading edge slots and flaps as required to provide high lift performance. Landing gears 45 are attached to the bottom of the fuselage in a structure extending to the longitudinal "keel" and permitting the undercarriage to be raised into the aircraft during flight.

As shown, preferably six sets of landing gear are provided. To turn the aircraft on the ground, the front sets may be partially retracted and the fuselage pivoted about the center, under the wing set by appropriately directing the independently positionable rear set. This minimizes the turning radius of the aircraft, permitting it to be handled at many conventional airport facilities.

While the aircraft structures may be of any size, the size being determined in general by the intended application, it is particularly advantageous for transporting heavy, high-volume loads. For example, it may transport huge volumes of relatively light cargoes, such as liquified hydrogen or other gaseous fuels. It is also capable of being constructed in a size sufficient to transport heavy pieces of large equipment already assembled, such as the well known space shuttle vehicle and external propellant tanks now being designed under government contract. In general terms, the size of the aircraft required for such applications would include a fuselage of approximately 650 feet in length, a wing span of approximately 530 feet, a wing cord of 51 feet, a wing thickness of 11 feet 6 inches, and wing area of 14,133 sq. ft. In cross section the fuselage would be approximately 115 feet by 177 feet. The longitudinal cargo area would be about 40 feet by 40 feet in cross section and 300 feet long. It is estimated that such an aircraft would enclose about 7 million cubic feet of helium providing at sea level a buoyancy of 478,000 pounds. The capabilities of such an aircraft include a payload estimated to be about 400,000 lbs, a range of about 10,000 miles, a sea level takeoff lift at 75 mph, indicated air speed of 1,000,000 lbs. and a cruising speed at 18,000 feet of over 200 mph indicated.

The relationships of the weight, size and buoyancy of the aircraft is important. If the buoyancy of the aircraft is increased sufficiently to largely offset it weight, then the resulting vehicle becomes quite responsive to ground wind conditions and very difficult to moor, load and unload. If on the other hand, the buoyancy is reduced to minimize this problem, greater aerodynamic lift is required to fly the vehicle which in turn increases takeoff and landing field requirements, necessary engine power, reducing the efficiency and economy of the aircraft. Thus, a balance of these factors is preferred.

As an illustration of how this preferred balance may be determined, assume that it is desired for the aircraft of the size just described to be able to resist a maximum cross wind of 38 mph while resting on its landing gears without ground restraint. By conventional analysis techniques, using a total aircraft area exposed to this moderate cross wind force of 49,000 feet$^2$, the wind loading or total side force is 165,000 pounds. Using a friction coefficient for a wet runway of 0.65, the minimum normal force (or effective weight) of the aircraft is 247,000 pounds. If the total weight of the aircraft completely assembled but unloaded and without any buoyancy is 727,000 pounds then a buoyancy sufficient to offset 478,000 pounds is desired. This in turn determines the volume of buoyant gas required, which if helium is about 7 million cubic feet as previously cited. To hold the aircraft in higher crosswind conditions, a hydraulic pin mooring station 55 may be provided on the landing field to engage a socket 56 in the aircraft at or near its center of gravity, the aircraft being lowered onto the pin by kneeling the landing gear. Another advantage of this landing gear is that it adapts the aircraft for operation from unimproved landing fields.

Employing a lifting fuselage design as described will provide nearly 200,000 pounds of lift at sea level and at a take-off speed of 75 mph, while providing up to 1 million pounds of lift at cruising altitude (18,000 feet) and speed (205 mph). Thus the wings must provide up to 865,000 pounds of lift at takeoff with a maximum payload which is achieved by the preferred wing design. As the airspeed increases, the lift from the aerodynamic fuselage and the wings increases. Accordingly, the proposed configuration is able to climb rapidly from takeoff to cruise altitude where the loss in lift provided by the buoyant cells of fixed volume is more than offset by the increased aerodynamic lift.

In large part the aircraft can be assembled with currently available elements. For example, the flight deck included in the nose 11 can be that of an U.S. Air Force C-5A cargo airplane. It contains all of the necessary features and accommodations, instrumentation space, flight and engineering controls. The flight surfaces and aircraft equipment are controlled through a fly-by-wire system which sends electrical impulses from the onboard computer to the various integrated actuator packages dedicated to the specific control surface, device, or equipment to overcome the inherent delay in response occasioned by the use of mechanical cables and rigid links over the extensive distances between the control center and the output point. The landing gears 44 preferably are the computer controlled swivelling-kneeling gear elements of that used by or similar to the C-5A mounted cargo airplane on an 80 track width. This landing gear arrangement exeeds the maximum load requirements for the aircraft of the size previously described. Sufficient propulsive thrust could be provided for the aircraft by four C-5A jet power plants, each of 41,000 pounds static thrust, these power plants being manufactured by General Electric Company under the military designation of TF-39-GE-1. The preferred design, however, utilizes eight turboprop engines teamed with two-main jet engines and the two outboard vector thrust engines, since this arrangement enables the aircraft to meet a much broader spectrum of mission applications with a minimized fuel consumption. A wing design providing substantial aerodynamic lift in an airstream with a minimum of aerodynamic drag, one already tested and satisfactory for the aircraft of the size previously described is that developed by the Hughes Aircraft Company in the 1940s for the HK-1 flying boat. An aluminum version of this wing already has been designed.

While there are various materials that may be used for the structural members and fabric, an excellent and preferred material is Kevlar, an aramid fiber developed by E. I. du Pont de Nemours & Company of Wilmington, Del. It is available in at least two types, a more flexible type referred to as Kevlar 29 and a less flexible, Kevlar 49. Both may be fabricated as a fabric; a triaxial weave coated Kevlar fabric has been developed by Doweave, Inc. and produced by ILC Industries in association with E. I. du Pont de Nemours & Company. It is preferred to fabricate the gores or panels of such Kevlar 29 fabric, and the exoskeleton members of a Kevlar 49 material. The techniques and machinery required to form seams in such a fabric has been developed by ILC Industries.

Significant fuel savings can be realized by employing this semi-buoyant aircraft as a transport for large volume, heavy cargo. Projections comparing its fuel consumption in the configuration just described to that of a DC-8 aircraft indicate that it can transport more than twice the payload, or ton-miles, as conventional jet cargo aircraft, although the disclosed aircraft would take more than twice as long to make the trip.

Various features of the described aircraft contribute and combine to provide the significant increase in volume and weight carrying capability. Notable among these features is the exoskeleton fuselage incorporating one or more gas-tight cells, containing a buoyant gas such as helium under low pressure at sea level. As the aircraft accellerates during its rise to operating altitudes, while the lift imparted by the buoyant cells decreases, the lift imparted by the aerodynamic configuration of the fuselage and wings more than compensates for this loss of buoyancy. In flight the angle of attack of the fuselage normally is zero to minimize drag.

Figure 3:
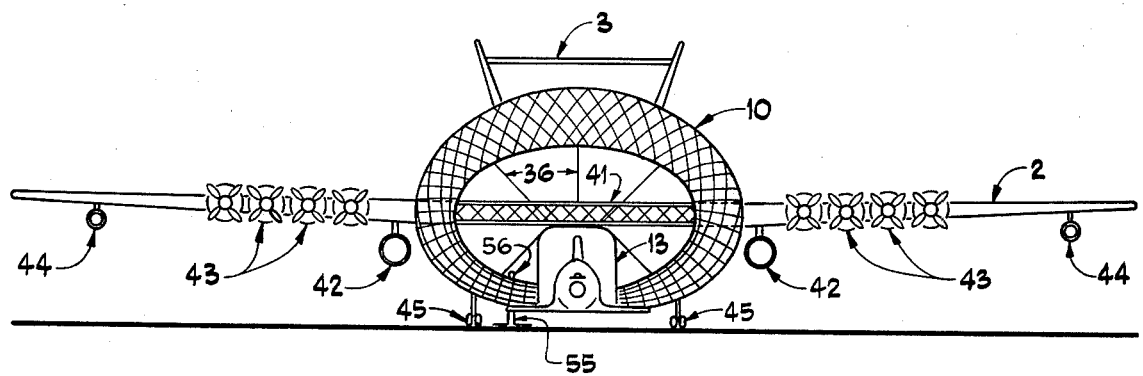
FIG. 3 is a lateral cross-sectional view of the preferred aircraft structure on a plane indicated by lines III—III in FIG. 2.

The configuration of the aircraft also enhances the structural stiffness of the fuselage and permits significant weight reductions in the internal structure requirements. In addition, since the buoyant cells within the fuselage are of a fixed volume as the aircraft rises to cruising altitudes the pressure within the cell and relative to the surrounding air will increase, further enhancing the structural stiffness of the fuselage. Specifically, if the buoyant cells are filled with helium at sea level to a pressure of 0.5 psi, then at 18,000 feet the internal pressure in the cells will be approximately 5 psi. While this pressure is not so great as to challenge the exoskeleton structure, it is sufficient to significantly increase the rigidity of the aircraft fuselage. The longitudinal channel defining the cargo compartment forms a major longitudinal structure reinforcing the fuselage. The cargo in turn can be supported on removal pallets or floor sections 60 which can be preloaded in other areas and moved to the aircraft to be placed into position in the aircraft. This removable floor configuration of cargo area also permits outsized cargo such as the NASA Space Shuttle to project beyond the confines of the channel, as shown in FIG. 3, further extending the capability of the aircraft.

For safety reasons, the fuselage also contains at least two auxiliary inflatable envelopes, a forward cell 61 and an aft cell 62 which will be inflated as determined to be required by the on-board computer to trim the aircraft in flight with normal air in the event of loss of buoyancy gas, cargo shift, and fuel consumption. As an added feature these envelopes can be charged with heated air bled from the jet engines to augment buoyancy in the event that a large volume of buoyancy gas is lost or vented due to anomolies in outside pressure which require such action to prevent catastrophic loss of the aircraft. For example, it is apparent that the gas envelope must be provided with automatic relief values to prevent over pressurization of the interior. Such an event could occur through the ordinary and simple loss of correct altitude display, leading the pilot to rise to an over-design altitude, or an inflight accident could result in loss of an entire 100 square foot envelope panel. It has been estimated that a two square foot hole would result in depressurization of a 10 psi charge of the aircraft in no less than 10 hours if the craft remained at the initial altitude of over 18,000 feet, while a 100 square foot hole would result in depressurization in one hour, normally adequate time to take corrective action.

Icing can be a serious problem, especially for such a large aircraft. To control this problem, it is preferred to bleed hot exhaust gas from the engines and flow it through both the hollow exoskeleton elements and the interior of the dual-layer fabric skin. Such a flow also may be used to control the boundary layer air flow about the fuselage, and to reduce or eliminate any turbulence, thereby minimizing the aerodynamic drag of the airship.

Since the aircraft incorporates both a buoyancy envelope shape as a lifting body and a conventionl high-lift wing, it achieves minimum runway loading, a short takeoff and landing requirement, and maximum cruise performance with minimum thrust requirements. The buoyant fuselage envelope, by canceling a major portion of the initial air frame dead weight, will significantly reduce runway loading and takeoff speed requirements, as well as the overall takeoff power requirement. With sufficient thrust provided by the multiple engines for takeoff and landing performance, cost effective cruise performance is assured.

In addition, the fixed volume of the buoyant cells enclosed in the fuselage also eliminates the requirement for variable volume buoyancy techniques to control rate of climb and descent. The high-lift wing with conventional slots, flaps and spoilers provides effective lift control during takeoff and landing. As speed and altitude are gained and buoyancy reduced, the lifting body configuration of the fuselage and wing provide the primary source of lift. A high operational ceiling thus is attained where wind resistance is much reduced and flight efficiency optimized.

While a preferred form of invention has been disclosed, various modifications will be apparent to those skilled in aircraft design, and of course, can be incorporated in the semi-buoyant aircraft structure. Therefore, the scope of the invention is set forth in the following claims.

We claim:

1. An aircraft structure including a fuselage shaped to provide substantial aerodynamic lift in an airstream with a minimum of aerodynamic drag, the fuselage including a rigid external framework formed by a web of tension members longitudinally extending about the fuselage in a relatively helical pattern, the fuselage also including a central longitudinal channel extending internally of said framework along the lower portion of the fuselage substantially the entire length thereof for reinforcing the fuselage and defining an area for receiving cargo, the fuselage further including a bouyant envelope contained within the rigid external framework and pressurized to bear on and reinforce the external framework, the bouyant envelope being of a volume defined by the rigid external framework, the pressure of the gas enclosed in the envelope increasing as the air pressure about the aircraft decreases to exert a force upon and further reinforce the rigid external framework as the aircraft rises to operational altitudes and speeds, a pair of wings attached to the fuselage in an opposed relationship and shaped to provide substantial aerodynamic lift in an airstream with a minimum of aerodynamic drag, the aerodynamic lift provided by the fuselage and the wings, together with the bouyancy provided by the bouyant envelope, being sufficient to maintain the aircraft airborne when in forward motion in an airstream, power means to impart forward motion to the aircraft, and sets of landing gear affixed to the fuselage at the forward, central and rearward portions of the aircraft, the landing gear sets being independently retractable and steerable permitting one end set of landing gear to be at least partially retracted and the aircraft turned on the central and other end set of landing gear when at rest turned on the central and other end set of landing gear when at rest upon the ground.

2. An aircraft structure as set forth in claim 1 including a socket in the fuselage near the aircraft's center of gravity to receive a mooring affixed to the ground and to assist in stabilizing the structure on the ground.

3. An aircraft structure as set forth in claim 1, in which the buoyancy imparted by the envelope is adjusted to offset the weight of the structure in excess of that necessary to stabilize the aircraft on the ground in a cross wind of moderate strength the aerodynamic lift afforded by the airfoil fuselage and wings being sufficient with the buoyancy of the buoyant envelope to enable the aircraft to lift off at a moderate ground speed.

* * * * *